United States Patent [19]
Duck et al.

[11] Patent Number: 5,701,375
[45] Date of Patent: Dec. 23, 1997

[54] METHOD AND SYSTEM FOR ALIGNING OF OPTICAL ELEMENTS

[75] Inventors: Gary S. Duck, Nepean; Yihao Cheng, Kanata; Koichi Abe, Ottawa, all of Canada

[73] Assignee: JDS Fitel Inc., Nepean, Canada

[21] Appl. No.: 626,610

[22] Filed: Apr. 2, 1996

Related U.S. Application Data

[63] Continuation-in-part of Ser. No. 462,149, Jun. 5, 1995.
[51] Int. Cl.⁶ .................................................. G02B 6/38
[52] U.S. Cl. .................................................. 385/74
[58] Field of Search .............................. 385/31, 33, 34, 385/35, 38, 39, 74, 75, 88, 129, 147

[56] References Cited

U.S. PATENT DOCUMENTS

| | | | |
|---|---|---|---|
| 4,257,872 | 3/1981 | Balliet | 385/35 |
| 4,797,144 | 1/1989 | DeMeritt et al. | 65/102 |
| 4,834,494 | 5/1989 | DeMeritt et al. | 385/61 |
| 4,929,045 | 5/1990 | Fuller | 385/33 |
| 5,066,089 | 11/1991 | Greil et al. | 385/35 |
| 5,357,590 | 10/1994 | Auracher | 385/35 |
| 5,377,287 | 12/1994 | Lee et al. | 385/35 |
| 5,434,940 | 7/1995 | Roff et al. | 385/91 |
| 5,459,802 | 10/1995 | Kyouya et al. | 385/35 X |
| 5,577,146 | 11/1996 | Musk | 385/92 |

*Primary Examiner*—Akm E. Ullah
*Attorney, Agent, or Firm*—Neil Teitelbaum & Associates

[57] ABSTRACT

A system for automatically aligning optical components without active alignment techniques is provided. Optical components are placed into an alignment sleeve having an opening with a diameter sized to tightly receive optical components. Optical fibers having thermally expanded core ends are used to coupled light within the alignment sleeve. In instances where the optical fibers are offset from the longitudinal axis of the sleeve, means are provided to prevent rotation of an optical fiber tube holding the optical fibers.

10 Claims, 10 Drawing Sheets

*PRIOR ART*

METHOD AND SYSTEM FOR ALIGNING OF OPTICAL ELEMENTS

This application is a continuation-in-part of application Ser. No. 08/462,149 filed Jun. 5, 1995.

FIELD OF THE INVENTION

This invention relates generally to the alignment of an optical fiber with an optical component, more specifically, it relates to the use of a tube, ferrule, or sleeve, to accommodate a plurality of optical components for alignment.

BACKGROUND OF THE INVENTION

Precisely aligning an optical fiber with one or more optical components such as graded index (GRIN) lenses, filters, and, or other optical fibers or components is generally a time consuming activity requiring a high degree of precision from an operator. In general, optical fibers that are to be aligned with one another through a lens or an optical element have to be actively aligned in a manner whereby light is directed into a first fiber that is moved and positioned relative to a second fiber until suitable alignment is achieved. A detector at an output end of the second optical fiber indicates alignment when a test light incident upon a detector is at a maximum intensity. The difficulty of aligning single mode optical fibers is that the core of single mode fiber is typically very small, in the range of 8 to 12 µm. In particular instances, the core may be as small as 4 µm. Thus, the allowable tolerance in aligning two single mode optical fibers is typically less than 1 µm.

One of the more ubiquitous building blocks used in the design and manufacture of optical elements is the GRIN lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices. A particular aspect of this invention is related to the use of GRIN lenses in combination with other optical elements.

It is an object of this invention to provide a simple method and system for aligning optical elements with one or more single mode optical fibers that is within acceptable tolerance limits, so as to minimize coupling losses due to misalignment.

It is a further object of the invention to provide a method and system for aligning optical elements that does not require active alignment techniques.

It is yet a further object of the invention, to provide a simple means of coupling and automatically aligning a small-diameter-core optical fiber, and a GRIN lens with other optical components, wherein spherical aberration normally associated with coupling small-diameter-core (hence large NA,) optical fiber to such a lens is lessened.

SUMMARY OF THE INVENTION

In accordance with the invention, an alignment system for aligning optical components is provided, comprising:
a first optical fiber having an end that has a thermally expanded core, said end having a diameter that is substantially larger than the diameter of another portion of the core, said first optical fiber end being held in an optical fiber tube having a predetermined outer diameter;
a lens having a predetermined outer diameter;
and an optical element having a predetermined outer diameter, an alignment sleeve having an opening that tightly accepts and receives the optical fiber tube, the lens, and the optical element.

In accordance with the invention, there is further provided an alignment system for aligning optical components comprising:
a first optical fiber having an end that has a thermally expanded core, said end having a diameter that is substantially larger than another portion of the core, said first optical fiber end being tightly held in an optical fiber tube having a predetermined outer diameter;
and an optical element having a predetermined outer diameter or being held by a holder having a predetermined outer diameter within predetermined limits; and,
a common alignment sleeve at least a portion of which has an opening with a diameter that substantially corresponds to the outer diameter of the optical fiber tube for tightly receiving the optical fiber tube and having a portion of which has a diameter that substantially corresponds to the outer diameter of the optical element or the holder, the alignment sleeve for receiving the optical fiber tube and the optical element or the holder.

In accordance with the invention there is further provided, an alignment system for aligning optical components comprising:
a first optical fiber having an end that has a thermally expanded core, said end having a diameter that is at least twice the diameter of another portion of the core, said first optical fiber end being tightly held in an optical fiber tube having a predetermined outer diameter;
and an optical element having an outer diameter or being held by a holder having an outer diameter that corresponds to the outer diameter of the optical fiber tube, within predetermined limits; and,
a common alignment sleeve at least a portion of which has an opening with a diameter that substantially corresponds to the outer diameter of the optical fiber tube for tightly receiving the optical fiber tube and the optical element.

In yet another aspect of the invention there is provided an alignment system for aligning optical components comprising:
an alignment sleeve at least portion of which has an opening with a constant diameter for tightly receiving at least a first optical component;
an optical component inserted into the alignment sleeve opening, said optical component including a thermally expanded core optical fiber end, said optical component having an outer diameter for tightly mating with the opening of the alignment sleeve.

In accordance with another aspect of the invention, there is provided, a method of aligning two optical fibers, said fibers having a core diameter at end face thereof of at least 2 times the diameter of another portion of the core, one of the optical fiber ends having a core that is thermally expanded, said method comprising the steps of:
placing each of the optical fibers into an optical fiber tube having a predetermined outer diameter of x µm;
providing a lens that has an outer diameter substantially equal to x µm;
providing an alignment sleeve having an inner diameter that is substantially equal to x µm for tightly receiving the optical fiber tubes, and the lens; and,
positioning the optical fiber tubes and the lens into the alignment sleeve, the lens being positioned within the common sleeve between the first and second optical fiber tubes.

BRIEF DESCRIPTION OF THE DRAWINGS

Exemplary embodiments of the invention will now be described in conjunction with the drawings in which.

DETAILED DESCRIPTION

Figure 1:
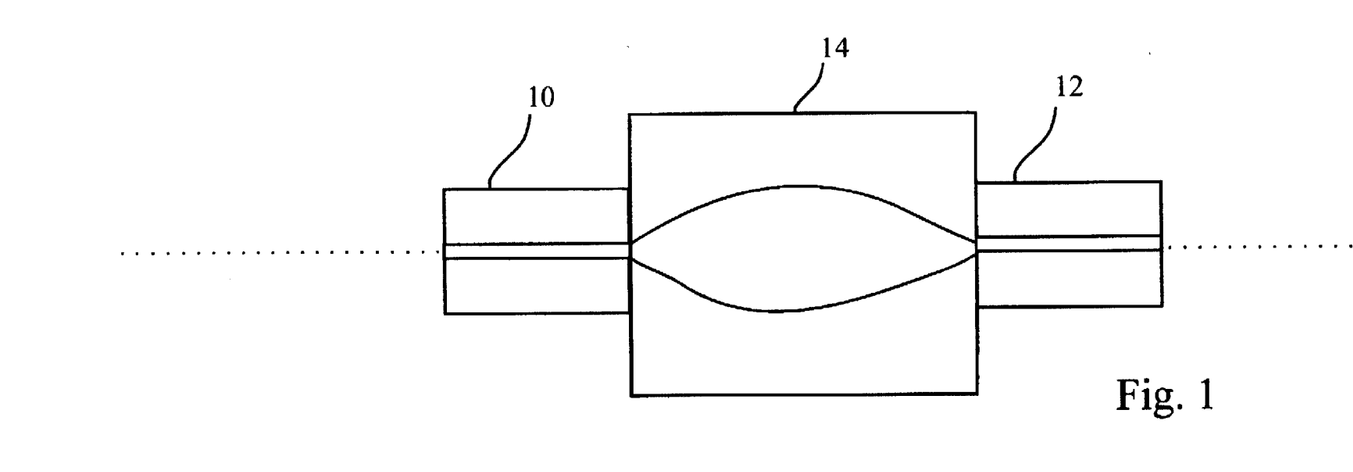
FIG. 1 is a side view of two single mode optical fibers conventionally coupled with a GRIN lens disposed therebetween, the optical fibers shown partially out of alignment for the purposes of illustration.

Referring now to FIG. 1, a first single mode optical fiber 10 having a constant core diameter of 10 µm is shown coupled to an end of a GRIN lens 14. The optical axis is positioned approximately 3 µm out of alignment with a juxtaposed second similar single mode optical fiber 12 at another end of the GRIN lens 14. In operation, only approximately half of the light exiting the first optical fiber 10 passing through the GRIN lens 14 is coupled to the second single mode optical fiber 12. Thus, the coupling efficiency of this arrangement is in most practical instances inadequate.

Figure 2:
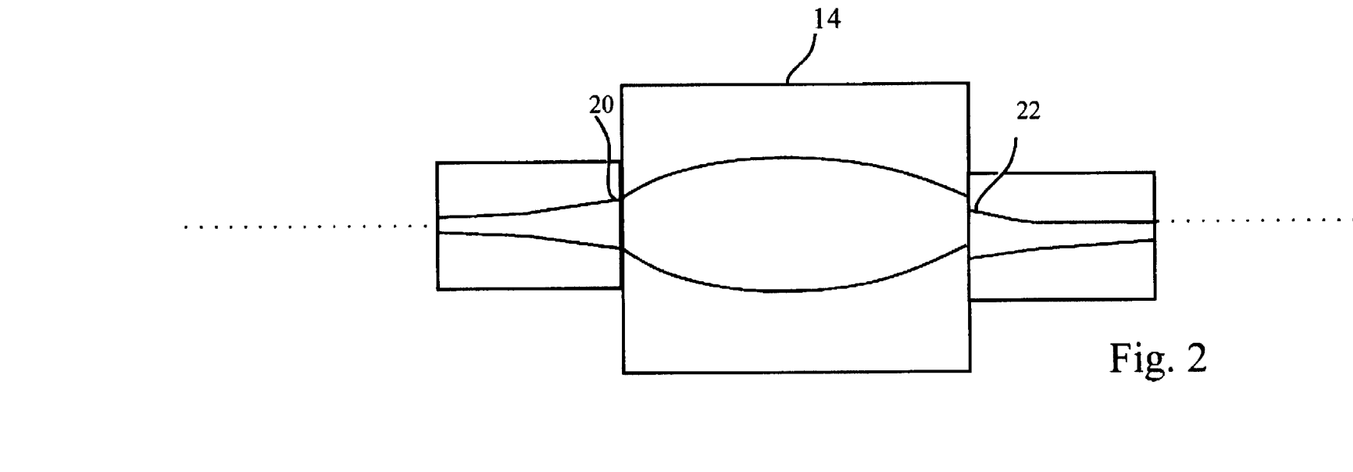
FIG. 2 shows two thermally expanded core optical fibers shown partially out of alignment having a GRIN lens disposed therebetween.

In FIG. 2, two optical fibers having thermally expanded core (TEC) ends 20 and 22 are optically coupled to one another via a GRIN lens 14. The ends 20 and 22 are expanded from 10 µm to about 40 µm by applying suitable heat to them. For the purposes of illustration, the fibers are offset from one another by 3 µm and their optical axes are not physically aligned; however, although the fiber ends 20 and 22 are offset by the same amount as the fibers 10 and 12, much less light is lost and higher coupling efficiency is obtained with the same physical misalignment of the optical fibers. In this instance about 95% of the light exiting the first optical fiber end 20 propagating through the GRIN lens 14 is coupled to the fiber end 22. Thus, due to the TEC ends 20 and 22 of the optical fibers, the arrangement shown in FIG. 2 couples light much more efficiently in the presence small alignment errors, than the system shown in FIG. 1.

Figure 3:
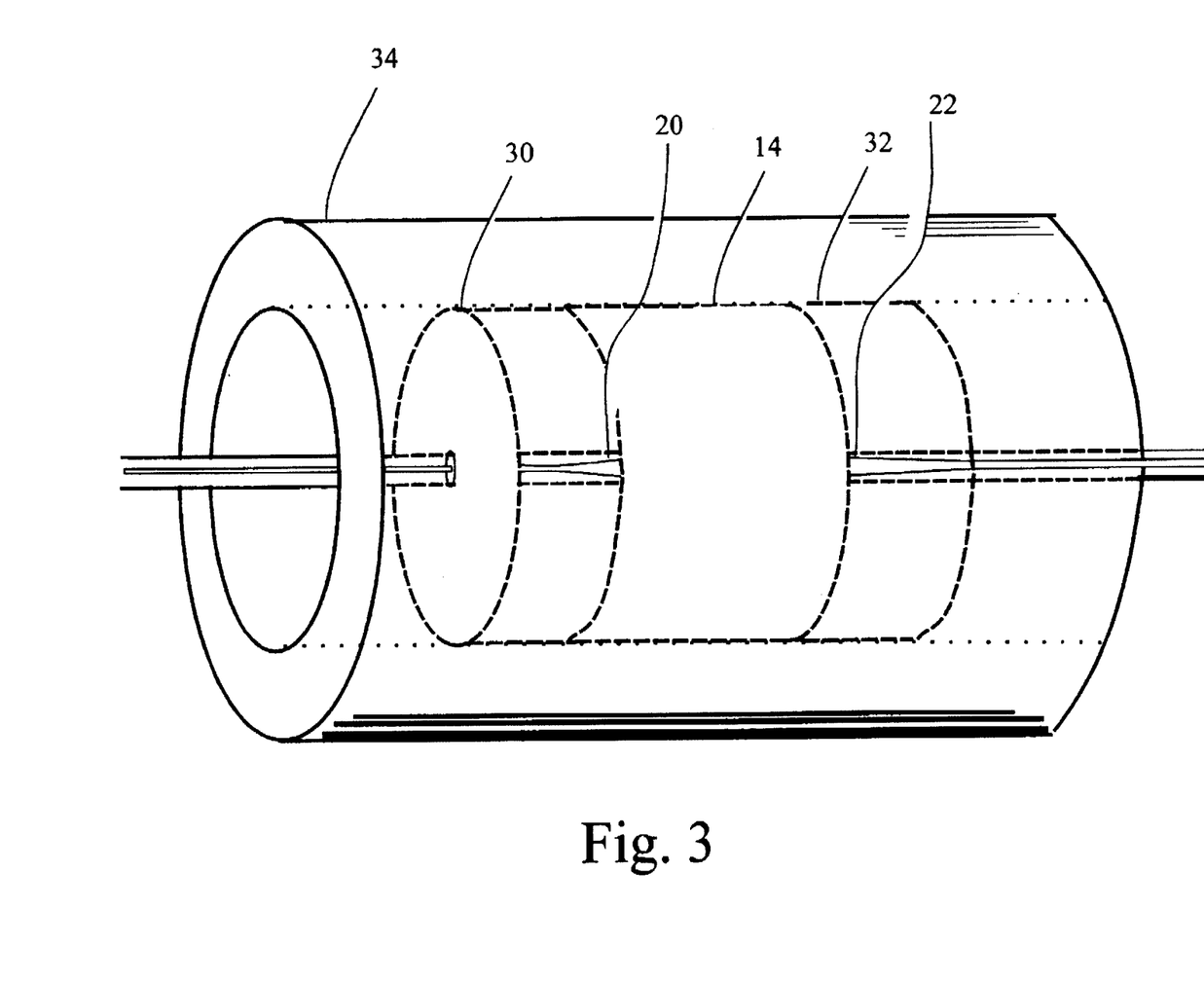
FIG. 3 is an illustration of a first embodiment of the invention showing a lens positioned between two optical fiber tubes within a positioning sleeve in accordance with the invention.

Referring now to FIG. 3, and in accordance with the invention, a system is shown wherein two single mode optical fibers having thermally expanded core ends 20 and 22, are optically coupled to one another through a GRIN lens 14. In this example, the optical fibers ends 20 and 22 are placed into fibre receiving openings in cylindrical optical fiber tubes 30 and 32 respectively. The tubes are precisely manufactured to have a predetermined outer radius x µm, that conforms to an inner diameter x µm of a common receiving alignment tube 34, wherein x can be any value within the capability of manufacturing. The GRIN lens 14 also has a same outer diameter of x µm that is within a predetermined small margin of error. The elements 30, 32 and 14 are manufactured to tightly fit within the common receiving alignment tube 34. Optionally, an adhesive can be applied to at least a portion of the side of outer wall of each of the tubes 30 and 34 to ensure that they remain in place. Described in more detail hereafter and in reference to FIGS. 7a to 7d, means can be provided within the alignment tube 34 and tubes 30 and 32 for ensuring that alignment exists, where necessary. By using TEC optical fibers in the arrangement shown in FIG. 3, small errors that may accrue due to a small variation in the manufacturing of the components will likely be tolerable. However, as was illustrated in the arrangement of FIG. 1, using constant diameter fibre, an alignment error of 3 µm would result in approximately half of the transmitted light being lost. The same alignment error using two TEC fibers having cores of approximately 40 µm would result in ~95% of transmitted light being coupled from one fiber end to the other.

Recently there have been requirements to use optical fibers having a small core diameter less than that of standard single mode optical fiber, i.e. of approximately 4 µm or less with lensed optical devices, particularly GRIN lenses. An impetus for utilizing a small core diameter optical fiber having a small mode field, is a high power density that is desirable for pumping rare earth, (i.e. erbium) doped amplifying optical fiber. However, a larger numerical aperture (NA) is required as a consequence of designing an optical waveguide that includes a smaller core diameter optical fiber that is single-mode at a given operational wavelength. Numerical aperture is inversely proportional to the square root of the core diameter. A consequence of a larger NA is a larger angular divergence of an output beam exiting the end-face of a small core diameter optical fiber. Furthermore, coupling a small core optical fiber (of diameter 4 µm or less) having a large NA (of 0.2 or greater) to a GRIN lens is also known to result in spherical aberration in the lens. As the NA of an optical fiber coupled to a GRIN lens changes, so does the beam profile within the GRIN lens; the beam diameter is directly proportional to the numerical aperture. Unfortunately, as the beam diameter within a GRIN lens increases, so does the spherical aberration due to the lens.

Aside from automatically aligning two optical fibers having a common optical axis by using a common sleeve into which components are placed, the present invention also lessens spherical aberration within a GRIN lens associated with using small core optical fiber, by providing TEC ends adjacent the GRIN lens to which they are coupled. This advantage is illustrated in FIGS. 4 and 5.

Figure 4:
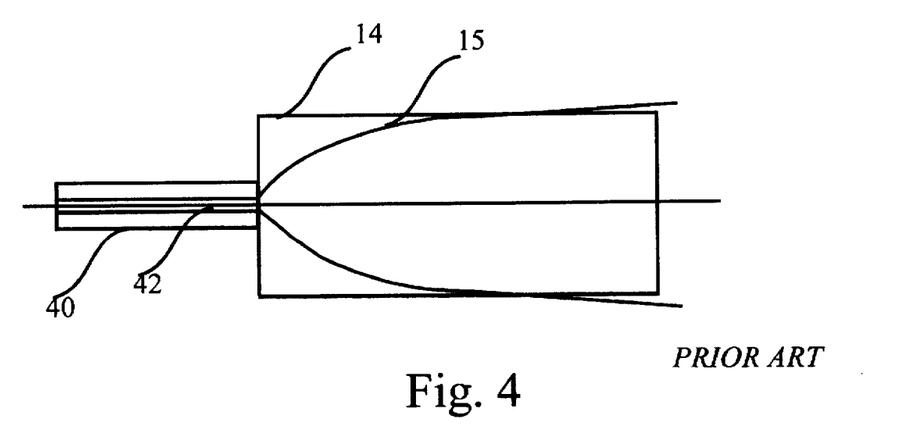
FIG. 4 is a side view of an optical fiber coupled to a GRIN lens as is known in the prior art.

Turning now to FIG. 4, a small-diameter-core 42 optical fiber 40 is shown coupled to a GRIN lens 14. The core of the optical fiber 40 has an constant diameter of 4 μm or less. The NA at the end-face of the optical fiber 40 is 0.2 or larger. The beam profile 15 is actually expanding in such a manner as to allow light to leave the lens via the side-wall.

Figure 5:
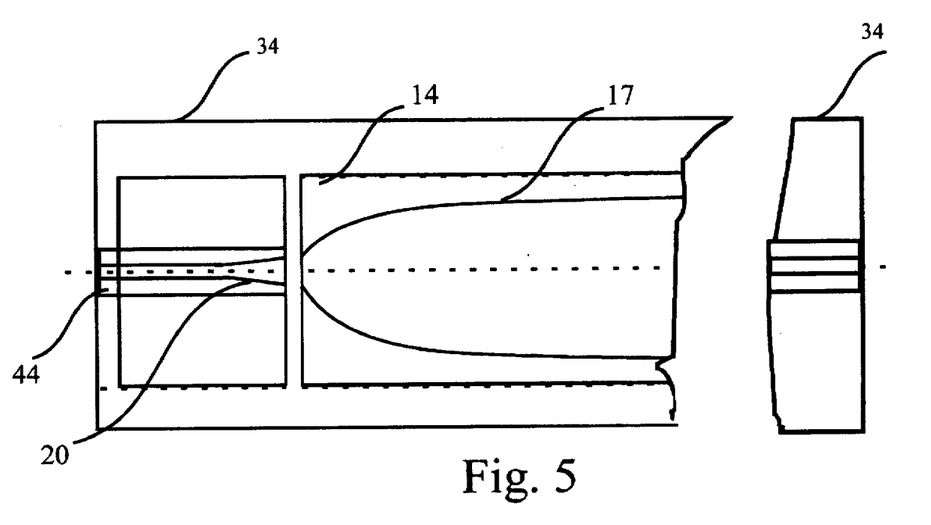
FIG. 5 is a broken-away side view of an expanded core optical fiber coupled to a GRIN lens and in an alignment sleeve in accordance with this invention.

Referring now to FIG. 5, an optical fiber 44 having a TEC 20 at one end is shown. The fiber 44 is coupled to a quarter pitch GRIN lens 14 similar to 14 in FIG. 4. The beam profile 17 is not only confined within the maximum NA of the lens but is also expected to have less spherical aberration than the beam profile 15 due to the use of the lens only at the centre portion where the refractive index profile is well controlled. Substantially the Entire length of the optical fiber 44, with the exception of an end portion has a mode field diameter (MFD) of 4 μm or less; the end portion has a thermally expanded core 20 with an MFD of more than 6 μm and preferably about 10 μm. The expanding end portion is about 5 mm in length. The small-diameter-core optical fiber having an expanded core end can be utilized or coupled with a GRIN lens to significantly reduce spherical aberration normally associated with coupling small-diameter-core optical fiber with a collimating lens; and, secondly, less precision is required in optically aligning the small-diameter-core optical fiber, since the ends coupled with the GRIN lens is larger and the fiber to fiber coupling efficiency will be less sensitive to small misalignment.

Figure 6A:
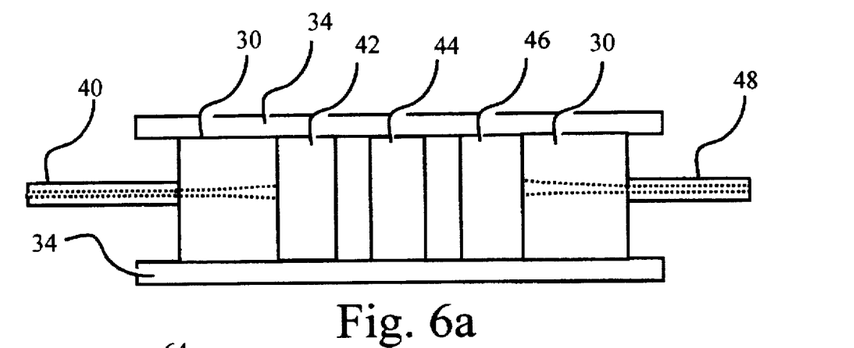
FIGS. 6a to 6c are side views of arrangements of optical components placed into an alignment sleeve.

Referring now to FIG. 6a, an alignment sleeve 34 tightly houses and accommodates a fiber tube 30 sized to snugly fit within the sleeve 34. The tube has a bore through its centre sized to receive and hold a first optical fiber 40 having a TEC end. Adjacent the tube 30 is a first GRIN lens 42 with an outer diameter also sized to tightly fit within the inside surface of the sleeve 34. An optical element 44, for example in the form of an optical filter, is disposed between the first lens 42 and a second GRIN lens 46. Spacer elements are placed on either side of the element 44. A second TEC optical fiber 48 held by an optical fiber tube 30 is inserted into the other end opposite the end accommodating the TEC fiber 40. Of course, the tubes 30, the lenses 42 and 46 and the spacers 44 are all of the same outer diameter sized to snugly fit into the alignment sleeve 34. By employing this technique of inserting into the sleeve 34 properly sized optical elements which conform to the inner diameter of the sleeve 34, alignment is automatically achieved within the tolerances of the optical elements. Due to the large mode field diameter and the small numerical aperture of optical fiber with a TEC end, slight variation in size of the inner sleeve diameter and the outer diameter of the optical components is acceptable within reasonable limits. By way of example, if the TEC optical fiber is misaligned as much as 10 μm, most of the light will still be coupled between the TEC optical fibers 40 and 48.

Figure 6B:
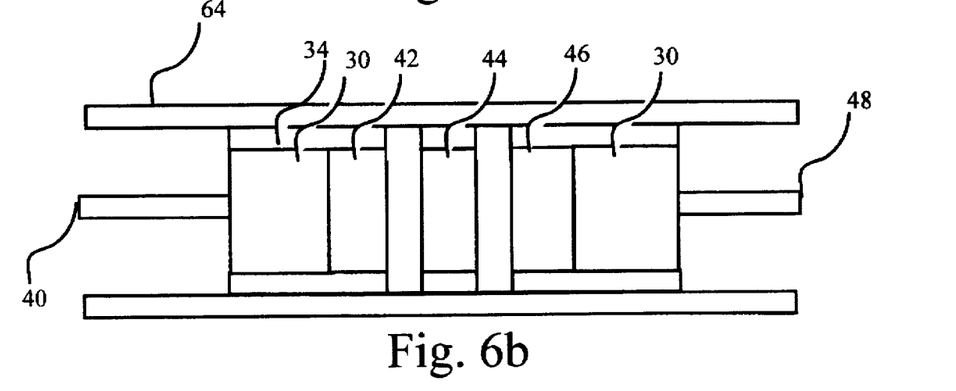

Referring now to FIG. 6b, an alignment sleeve 34 tightly houses and accommodates a fiber tube 30 sized to snugly fit within the sleeve 34. The tube has a bore through its centre sized to receive and hold a first TEC optical fiber 40 having an expanded end. Adjacent the tube 30 is a first GRIN lens 42 with an outer diameter also sized to tightly fit within the inside surface of the sleeve 34. An optical element 44, for example in the form of an optical filter, is disposed between the first lens 42 and a second GRIN lens 46. Spacer elements placed on either side of the element 44. A second TEC optical fiber 48 held by an optical fiber tube 30 is inserted into the other end opposite the end accommodating the TEC fiber 40. Of course, the tubes 30, the lenses 42 and 46 and the spacers 44 are all of the same outer diameter sized to snugly fit into the alignment sleeve 34. By employing this technique of inserting properly sized optical elements which conform to the inner diameter of the sleeve 34, into the sleeve, alignment is automatically achieved, within the tolerances of the optical elements. In this embodiment a second outer sleeve 64 is provided to accommodate the alignment sleeve 34.

Figure 6C:
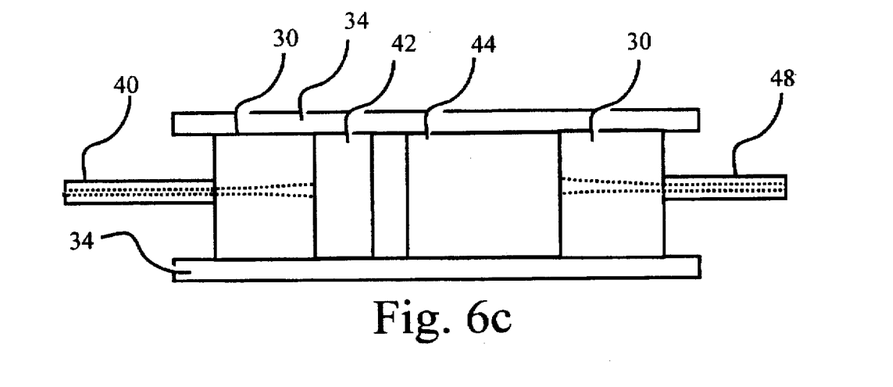

Turning now to FIG. 6c, a similar arrangement is shown to FIG. 6a. In this figure, however, a single GRIN lens coupled to an optical element is provided.

Figure 6D:
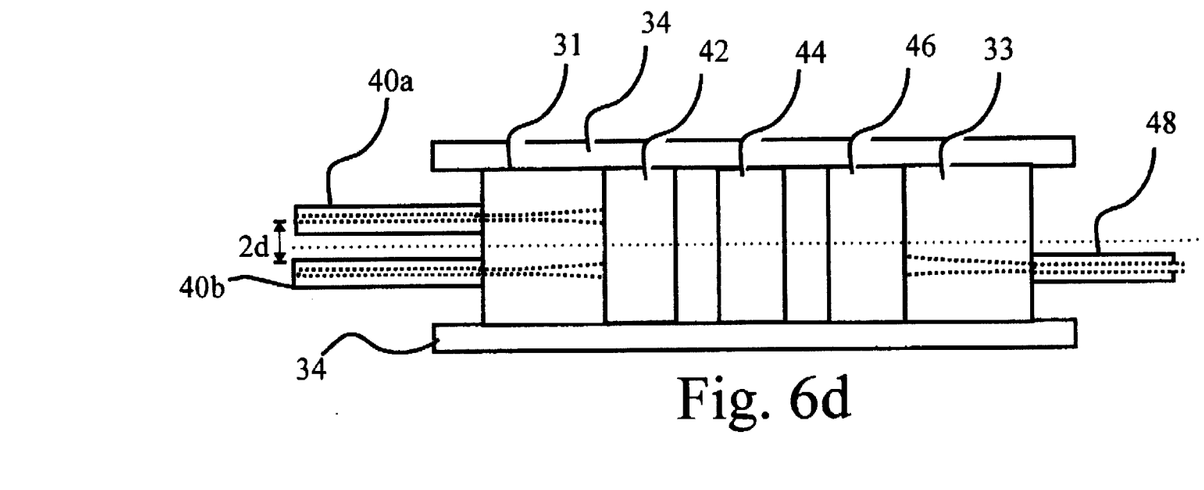
FIG. 6d is a side view of an arrangement of components placed in an alignment sleeve, the arrangement having optical fibers positioned offset from the optical axis of the alignment sleeve.
Figure 6E:
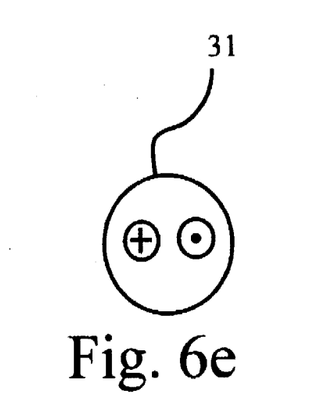
FIG. 6e is an illustration of an end view of the optical fiber holding tube shown in FIG. 6d.
Figure 6F:
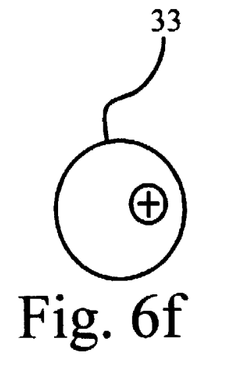
FIG. 6f is an end view of further optical fiber holding tube similar to the one shown in FIG. 6d.

An alternative embodiment of this invention can be seen by viewing FIG. 6d. Here two optical fibers 40a and 40b held by an optical fiber tube 31 are seen at the left side of the device. Both of these fibers have TEC ends. A third output optical fiber 48 having a similar TEC end and held within an optical fiber tube 33 is optically aligned with input optical fiber 40a and physically aligned with optical fiber 40b is shown displaced a distance "d" from the optical axis of the adjacent GRIN lens 46. The two optical fibers 40a and 40b are also displaced the same distance "d" from an optical axis of an adjacently located GRIN lens 42. A wavelength dependent optical filter 44 is disposed between the fibers 40a and 40b and the third output fiber 48. By arranging the optical fibers in this manner, light launched into optical fiber 40a is either transmitted to optical fiber 48, or is reflected to the thermally expanded core end of optical fiber 40b depending upon the wavelength of the light. By inserting all of the optical elements into a common alignment sleeve, several advantages are achieved. For example expensive and timely active alignment of the optical fibers and components is obviated. However, since the alignment of the optical fibers 40a with the third output fiber is necessary, and because these two optical fibers are offset from the common optical axes of GRIN lenses 42 and 46, it is necessary, in the absence of active alignment, to provide a means to guide and allow the tubes 31 and 33 to be inserted into the alignment sleeve 34, in only one correct aligned orientation. Such means are shown in FIGS. 7a to 7d which can conveniently comprise a groove or notch on one of the elements 31 and 33 and a correspondingly mating protruding lug on the other element 34a, or vice versa.

Figure 7A:
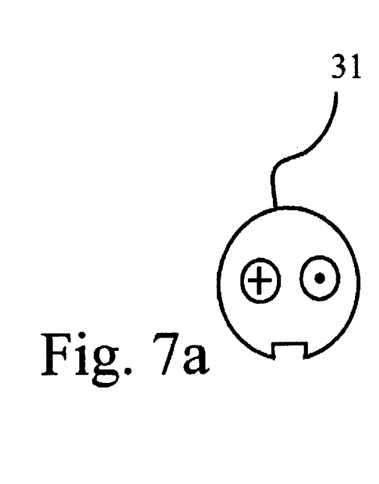
FIGS. 7a and 7b are end views of optical fiber holding tubes having means for ensuring the tubes are correctly oriented when placed into alignment sleeves.
Figure 7B:
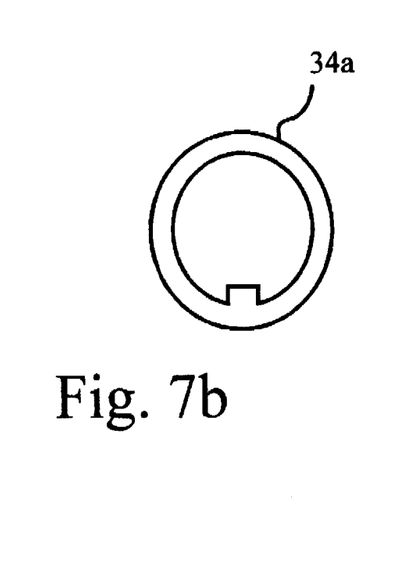
Figure 7C:
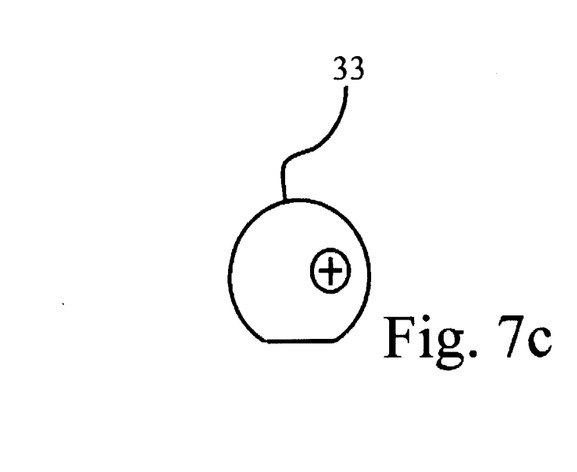
FIG. 7c and 7d are end views of alignment sleeves having means for mating with the optical fiber holding tubes in only a single predetermined orientation, in accordance with an aspect of this the invention.
Figure 7D:
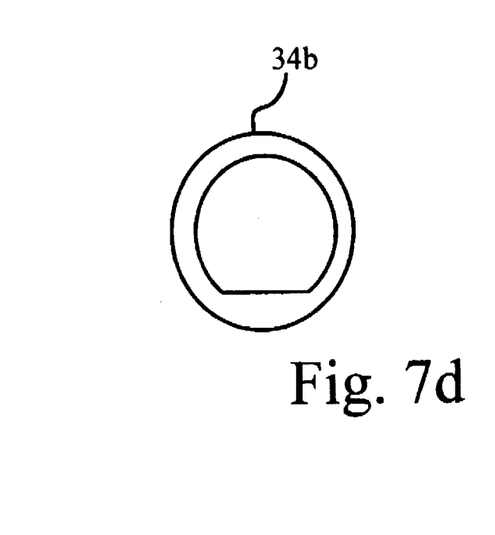
Figure 8A:
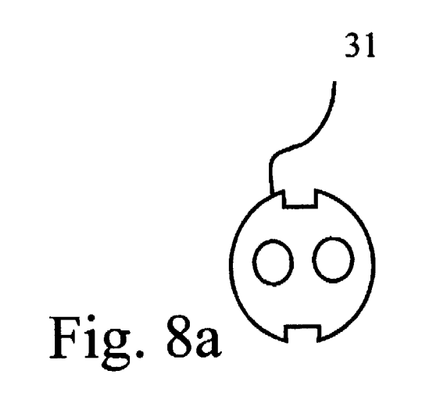
FIGS. 8a and 8b are end views of further optical fiber holding tubes having means for ensuring the tubes are correctly oriented when placed into alignment sleeves.
Figure 8B:
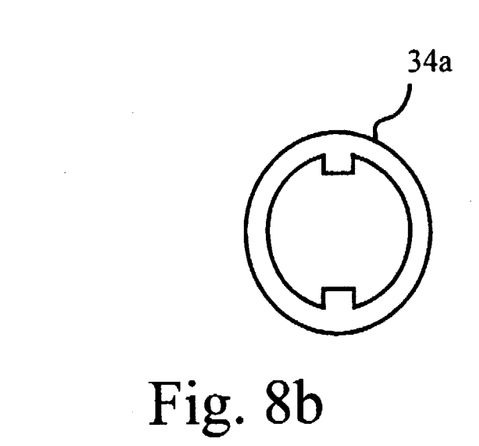
Figure 8C:
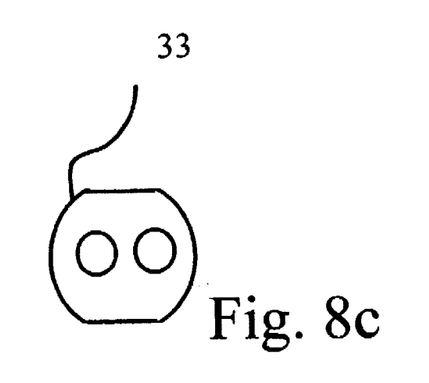
FIG. 8c and 8d are end views of alignment sleeves having means for mating with the optical fiber holding tubes shown in FIGS. 8a and 8b in one of two predetermined orientations, in accordance with a further aspect of this the invention.
Figure 8D:
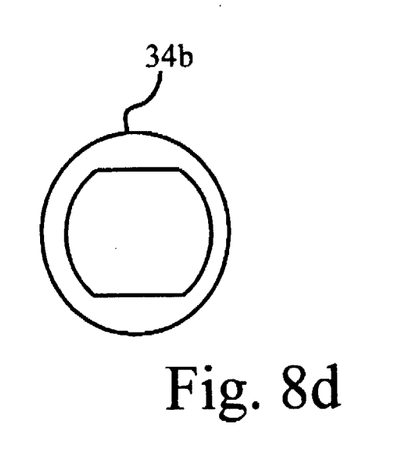

Other means as shown in FIGS. 7c and 7d that serve to ensure alignment are in the form of a beveled portion of the outside wall of the elements 33 and providing a corresponding flattened inside portion of the wall of the sleeve 34b. Of course, many similar means may be envisaged for ensuring that the alignment tube only receives particular components in one orientation and further preventing rotation of those components once inserted. In other instances where symmetry exists about an optical axis, means may be provided shown in FIGS. 8a to 8d to ensure that the alignment tube receives particular components in only a predetermined number of orientations, and wherein said means prevents rotation of those components once inserted.

Figure 6G:
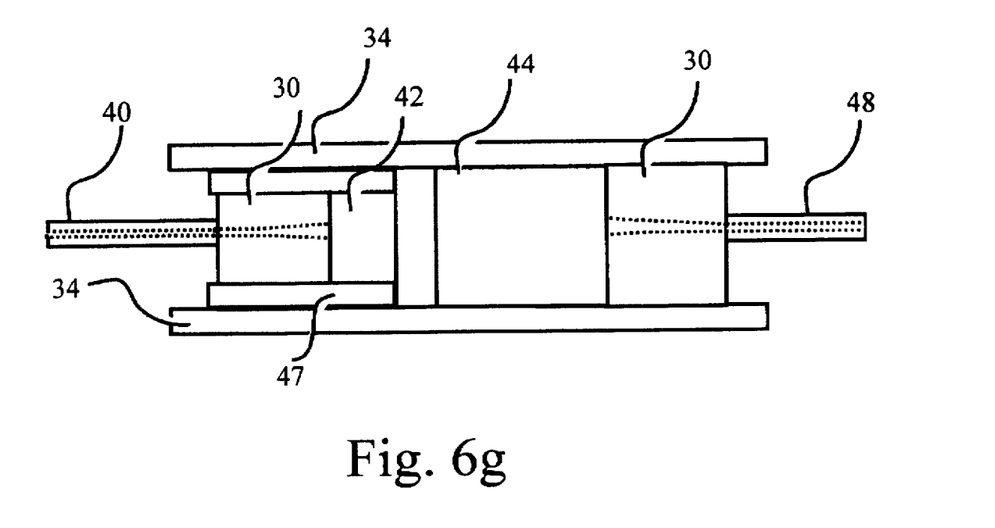
FIG. 6g is a side view of an alignment sleeve having optical elements inserted therein, including another alignment sleeve.

In some instances it is preferable to have a preassembled TEC fiber and GRIN lens unit ready for use in combination with a plurality of other elements in a common alignment sleeve. Such an arrangement is shown in FIG. 6g wherein an optical fiber tube 30 and a GRIN lens 42 are inserted into a first alignment tube 47 prior to being inserted into a common alignment tube 34 with a plurality of other optical elements.

Figure 9:
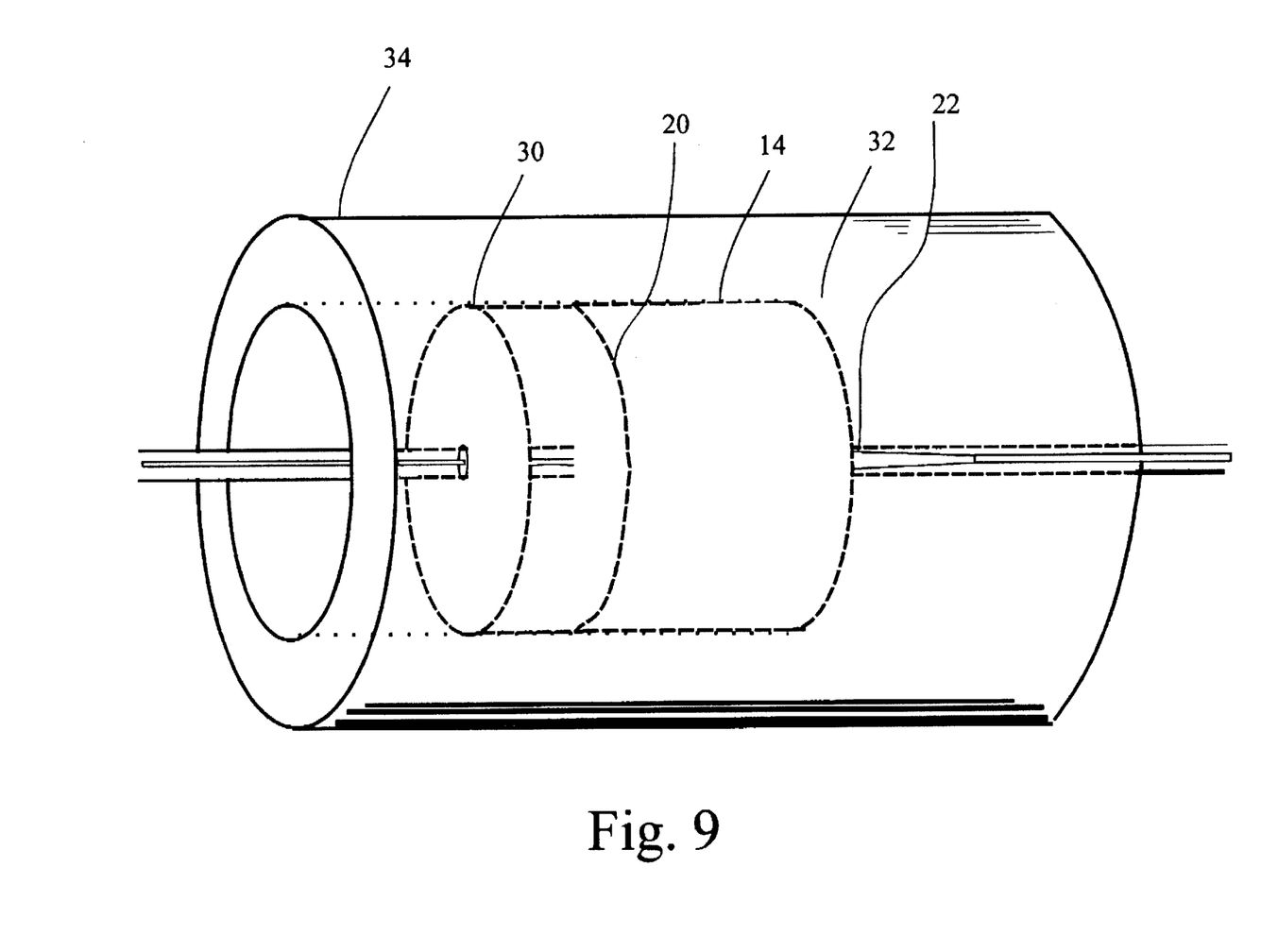
FIG. 9 is an illustration of a embodiment of the invention similar to that of FIG. 3, however having only a partial large opening for aligning optical components and having a smaller opening at another end for accommodating an optical fiber; and, FIGS. 10a to 10d show alternative embodiments of alignment sleeves in accordance with this invention.

Turning now to FIG. 9, an alternative embodiment of the invention is provided wherein an alignment sleeve 34 includes a large opening of diameter "x" at one end for accommodating optical components having an outer diameter "x". At another end of the sleeve 34 a small bore is provided for accommodating an optical fiber 22. Of course, alternatively the optical fiber may be inserted into a sleeve and polished before hand, then placed into a slightly larger bore having a diameter less than "x" (not shown).

Optical fiber tubes can be fabricated in lengthy section which can then be severed into short usable sections to ensure correspondence of holes for receiving fibers.

Figure 10A:
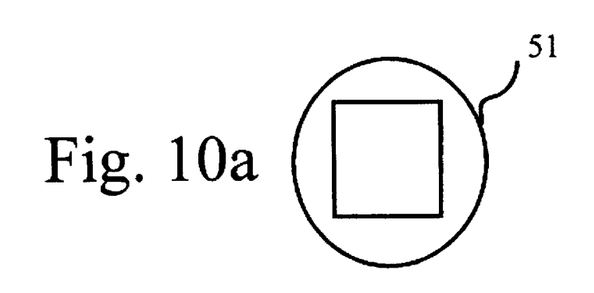
Figure 10B:
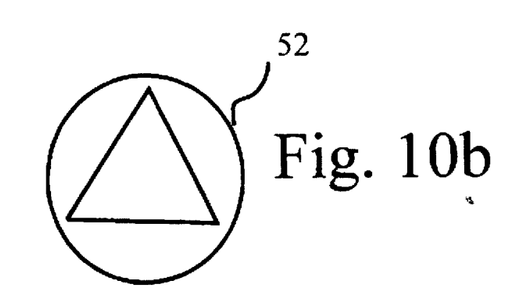
Figure 10C:
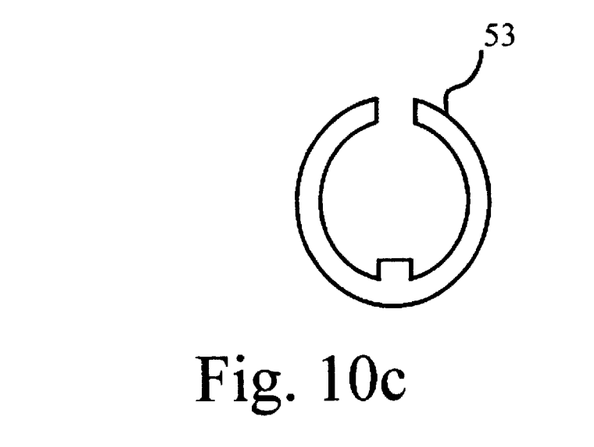
Figure 10D:
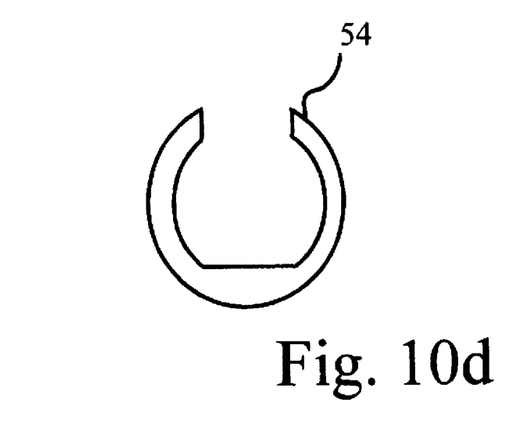

The alignment sleeve in accordance with this invention may be in the form of a conduit having at least a supporting wall, or a plurality of supporting walls. Variations of such conduits are shown in FIGS. 10a, 10b, and 10c are embodied by sleeves 51, 52, 53, and 54 respectively. Sleeve 10a is shown to have a square opening and sleeve 52 a triangular opening both being suitable for accommodating a cylindrical optical component.

Numerous other embodiments may be envisaged without departing from the spirit and scope of the invention.

What we claim is:

1. An alignment system for aligning optical components comprising:

a first optical fiber having an end that has an expanded mode field diameter, said mode field diameter being substantially larger than the mode field diameter of another portion of the fiber, said first optical fiber end being held in an optical fiber tube having a predetermined outer diameter;

a lens having a predetermined outer diameter;

and an optical element having a predetermined outer diameter;

an alignment sleeve having an opening that tightly accepts and receives the optical fiber tube, the lens, and the optical element.

2. An alignment system as defined in claim 1, wherein the alignment sleeve includes means for allowing the optical fiber tube to be inserted in a predetermined orientation and for preventing the optical fiber tube from rotating once inserted into the alignment sleeve.

3. An alignment system as defined in claim 1, wherein the end that has the expanded mode field diameter has a thermally expanded core end that is at least 1.5 times larger than the core at another portion of the fiber.

4. An alignment system as defined in claim 2, wherein the optical fiber tube includes openings for accommodating a plurality of optical fibers.

5. An alignment system as defined in claim 1, wherein the predetermined outer diameter of the optical fiber tube, the predetermined outer diameter of the lens and the predetermined outer diameter of the optical element, are substantially equal to a diameter of the opening.

6. A method of aligning optical fibers, at least one of the fibers having a mode field diameter at an end face thereof of at least two times that of another portion of the fiber, said method comprising the steps of:

providing two optical fiber tubes having a predetermined outer diameter;

placing the optical fibers into the optical fiber tubes;

providing a lens that has an outer diameter substantially equal to the outer diameter of the optical fiber tube;

providing an alignment sleeve having an inner diameter that is substantially equal to the outer diameter of the optical fiber tube for tightly receiving the optical fiber tubes, and the lens; and, inserting the optical fiber tubes and the lens into the alignment sleeve, the lens being positioned within the alignment sleeve between the first and second optical fiber tubes.

7. A method of aligning at least two optical fibers as defined in claim 6, wherein the step of placing the optical fibers into the optical fiber tubes comprises the step of placing one optical fiber in an opening along the longitudinal axis of one of the tubes, and placing another optical fiber in an opening along the longitudinal axis of the other of the tubes.

8. A method of aligning at least two optical fibers as defined in claim 6, wherein the step of placing the optical fibers into the optical fiber tubes comprises the step of placing two optical fibers in openings spaced a same distance from the optical axis of one of the tubes, and placing another optical fiber in an opening offset a same distance from the optical axis of the other of the tubes, all of the optical fibers having thermally expanded core ends.

9. An alignment system for aligning optical components comprising:

a first optical fiber having an end that has an expanded mode field, said first optical fiber end being tightly held in an optical fiber tube having a predetermined outer diameter;

and an optical element having a predetermined outer diameter or being held by a holder having a predetermined outer diameter within predetermined limits; and, a common alignment sleeve at least a portion of which has an opening with a diameter that substantially corresponds to the outer diameter of the optical fiber tube for tightly receiving the optical fiber tube and having a portion of which has a diameter that substantially corresponds to the outer diameter of the optical element or the holder, the alignment sleeve for receiving the optical fiber tube and the optical element or the holder.

10. An alignment sleeve as defined in claim 9, wherein an end of the alignment sleeve includes a bore of lesser diameter than the diameter of the opening, said bore for accommodating an optical fiber end.

* * * * *